United States Patent
Claesson

(10) Patent No.: US 6,374,501 B1
(45) Date of Patent: Apr. 23, 2002

(54) PORTABLE, COMBUSTION ENGINE POWERED CUTTING OR SAWING MACHINE

(75) Inventor: Tore Claesson, Örby (SE)

(73) Assignee: Aktiebolaget Electrolux (publ), Stockholm (SE)

( * ) Notice: Subject to any disclaimer, the term of this patent is extended or adjusted under 35 U.S.C. 154(b) by 0 days.

(21) Appl. No.: 09/567,075

(22) Filed: May 8, 2000

(30) Foreign Application Priority Data

May 10, 1999 (SE) .............................................. 9901679

(51) Int. Cl.[7] .............................................. B23D 45/16
(52) U.S. Cl. ...................................... 30/389; 125/13.01
(58) Field of Search ................. 30/389, 122; 125/13.01

(56) References Cited

U.S. PATENT DOCUMENTS

| | | | |
|---|---|---|---|
| 3,135,304 A | * 6/1964 | Breer et al. ..................... | 30/389 |
| 3,583,106 A | 6/1971 | Dobbertin ..................... | 51/170 |
| 4,352,241 A | 10/1982 | Johansson .................. | 30/123.4 |
| 4,646,607 A | 3/1987 | Johansson .................... | 83/853 |
| 4,856,195 A | 8/1989 | Grossmann et al. .......... | 30/369 |
| 5,038,474 A | 8/1991 | Larsson et al. ............ | 30/123.3 |
| 5,347,812 A | 9/1994 | Nilsson et al. ................ | 60/494 |
| 5,377,632 A | 1/1995 | Aronsson et al. ........... | 123/198 |
| 5,381,723 A | 1/1995 | Nilsson et al. ................. | 91/437 |
| 5,438,965 A | 8/1995 | Aronsson et al. ........... | 123/198 |

FOREIGN PATENT DOCUMENTS

| | | | |
|---|---|---|---|
| DE | 44 16 044 A1 | 11/1995 | .......... F16F/15/121 |
| GB | 1051277 | 12/1966 | |
| SE | 509 533 | 2/1999 | .......... B23D/61/10 |
| SE | 509 547 | 2/1999 | .......... B23D/61/10 |

\* cited by examiner

Primary Examiner—Douglas D. Watts
(74) Attorney, Agent, or Firm—Michael D. Bednarek; Shaw Pittman LLP

(57) ABSTRACT

A portable, combustion engine powered cutting or sawing machine comprises a rear part (1) with a motor housing (3) with a combustion engine (4), an engine block (5) with a crank house, and a front part (2) with an annular blade (30) and a blade holder (31). The blade is provided in/or adjacent to a center blade (37) of the machine. The engine block forms a central body in the machine, including portions of said body on both sides of said center plane, and the blade holder comprises a blade holder chassis (35), which is provided substantially on a first side of said center plane. The blade holder chassis is fixedly connected on one hand with the portion of the engine block, which is located on said first side of the center blade, and on the other hand with a portion which is located on a second, opposite side of the center plane.

6 Claims, 6 Drawing Sheets

PORTABLE, COMBUSTION ENGINE POWERED CUTTING OR SAWING MACHINE

TECHNICAL FIELD

The invention concerns a portable, combustion engine powered cutting or sawing machine comprising a rear part with a motor housing with a combustion engine and an engine block with a crankcase, and a front part with an annular saw and a blade holder. The invention particularly concerns a cutting or sawing machine of the mentioned type with a rear operating handle on said rear part, and a power transmission which includes a driving belt and at least one drive wheel in the blade holder for the drive of the blade.

PRIOR ART

A portable, combustion engine powered cutting or sawing machine is previously known through U.S. Pat. No. 4,352,241. It is a characterising feature of that machine that the rear part of the machine, including motor, operating handle and control means on one hand, and the front part of the machine with the cutting blade on the other hand, are pronouncedly displaced laterally relatively to one another, which is most clearly obvious in FIG. 1 and FIG. 2 in the patent document. This arrangement has several drawbacks. Firstly, the asymmetrical position of the saw blade may cause side ways directed kickbacks, which may cause severe injuries. Secondly, the machine is difficult and uncomfortable to operate in many situations; in short it has considerable deficiencies from an ergonomic point of view. These and other drawbacks basically are due to the fact that the motor housing and/or those components which are required for a combustion engine powered drive, such as crank case, fuel tank, fly wheel with fan and magnets, starter, air intake for fan and for engine, and exhaust gas purification, etc. necessarily form a voluminous unit. In order that the total dimensions of the machine shall not be still more increased, the blade from practical reasons therefore has been laterally displaced, in spite of the drawbacks caused by this arrangement. This and other circumstances are the reason why combustion engine powered cutting machines with an annular saw blade, so called ring cutters, have not made any break-through on the market place.

The development instead has taken the course towards hydraulic motor powered ring cutters, and this is particularly true after a very small, but at the same time very efficient hydraulic motor was developed, which is particularly adapted to ring cutters; U.S. Pat. No. 5,381,723 and U.S. Pat. No. 5,347,812. A hydraulic motor powered cutter or sawing machine having an annular blade, a so called ring cutter, which satisfies very high functional requirements, including very high requirements as far as safety and good working conditions are concerned, as well as, from an ergonomic point of view, is described in SE-C-509 533 and SE-C-509 547.

BRIEF DISCLOSURE OF THE INVENTION

Hydraulic motor powered cutting machines, however, have one deficiency; they need to have a hydraulic power pack. It is true there exist portable power packs with a hydraulic pump, which can be powered by a combustion engine or by an electric motor, but in many situations there is no hydraulic power packs available or it is not possible to have such mobile power packs. Typical situations of that kind are in connection with accidents, fires, and on remote places and also, more generally, in regions having a low developed infrastructure. It has therefore existed a long felt demand for a combustion engine powered ring cutter with features which from an ergonomic and safety point of view which are equally or at least comparably good as those of hydraulic motor powered ring cutters and with performances which also in other aspects are good or very good.

In the invention aims at satisfying the said demands. The demand as far as good ergonomic conditions is concerned inter alia implies that the machine shall be well balanced and have a generally slender design, particularly in comparison with the previously known combustion engine powered ring cutter, U.S. Pat. No. 4,352,241, but also as far as the safety is concerned, slenderness and a balanced design has great importance. A slender, i.e. a comparatively elongated and slim design, however, also may mean fragility. It is a purpose according one aspect of the invention to address also that problem and to provide a ring cutter which is slender but nevertheless has a design which is robust and has a high resistance to bending moments, including a good strength against forces in all directions, i.e. axial or frontal forces, as well as torsion forces upwards or downwards, and lateral.

These and other objectives and advantages of the invention can be fulfilled through what is stated in the appending patent claims and in the following description of a preferred embodiment.

BRIEF DESCRIPTION OF DRAWINGS

In the following description of a preferred embodiment of the invention, reference will be made to the accompanying drawings, in which.

DESCRIPTION OF A PREFERRED EMBODIMENT

Figure 1:
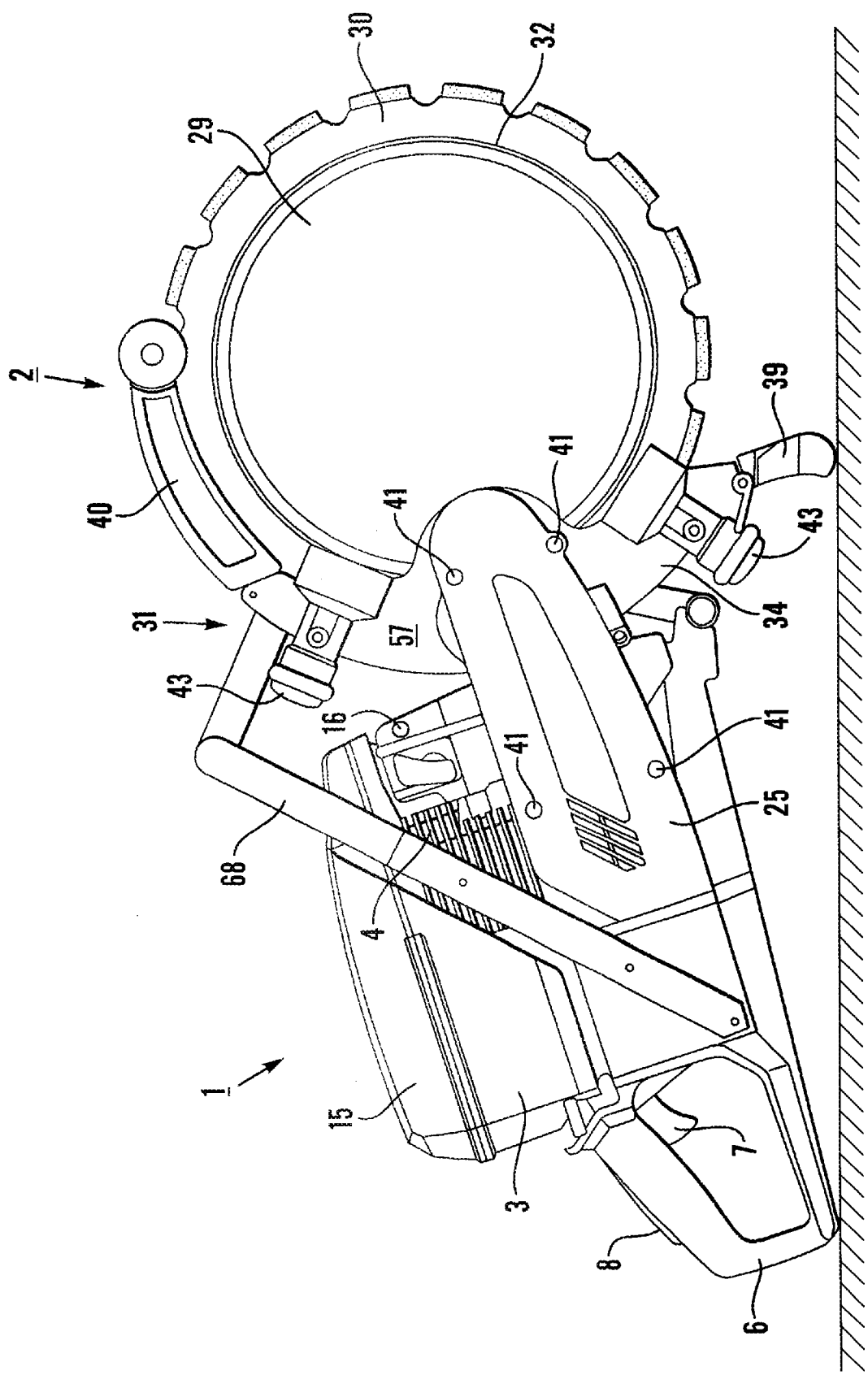
FIG. 1 is a side elevation from the right of a portable motor cutter or sawing machine having an annular blade, in the following referred to as ring cutter.
Figure 2:
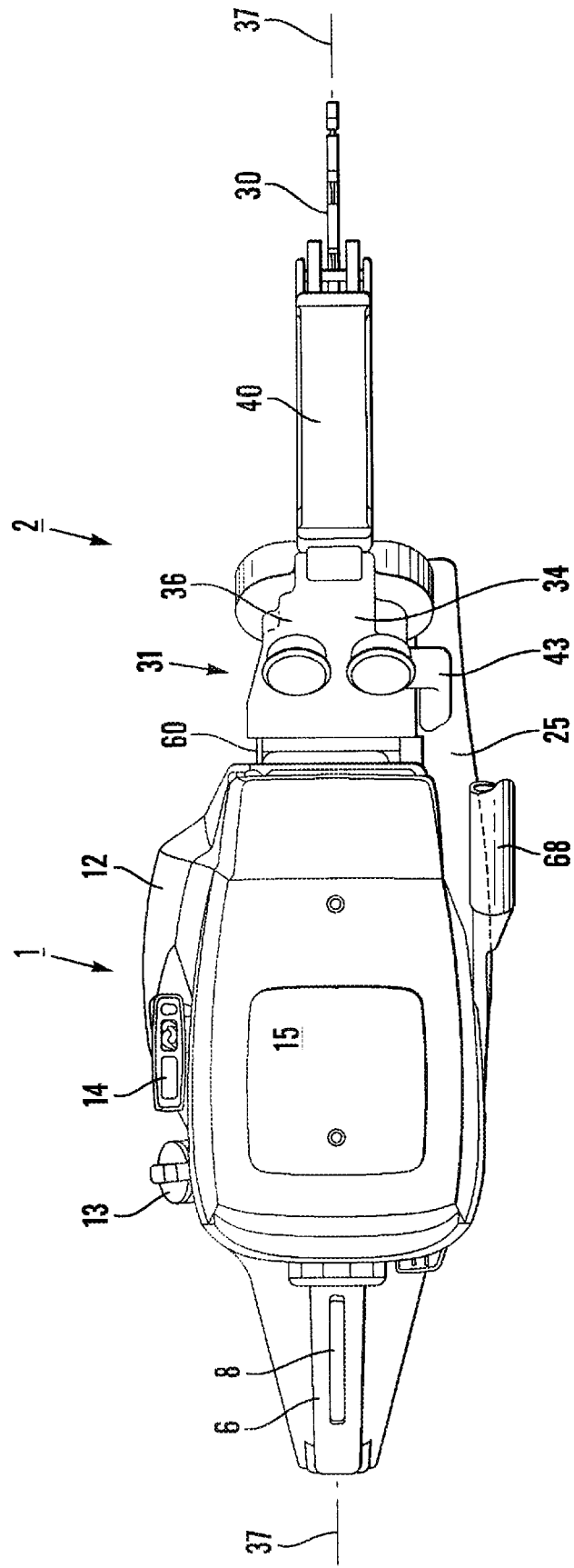
FIG. 2 is top view of the ring cutter.

The ring cutter shown in the drawings has a rear part 1 and a front part 2. In the rear part 1 there is a motor housing 3 with a combustion engine 4, an engine block 5 with a crankcase, and a rear operating handle 6 with motor controls 7, 8. The motor housing 3 with engine and auxiliary elements has a general design which is known per se and which is employed in some existing cutting machines, which are powered by a combustion engine and in which the cutting disc is of a conventional type and is mounted on a projecting cutting arm, such as on the cutting machine that is marketed under the trade name PARTNER®K950.

On the right hand side of the engine block/crankcase 5 there is a drive wheel 10 for a driving belt 11, which is of the flat and broad, multi-grooved type which nowadays to a great extent is used in connection with motorcar engines for the drive of generators, water pumps, etc. and which can withstand substantially higher rates of rotation than conventional V-belts. The drive wheel 10 in a conventional mode is connected to the crankshaft of the engine via a centrifugal clutch.

On the left hand side of the rear part 1 under a left hand side cover 12, there are accommodated a not shown fly wheel with fan and magnets, an air intake for the fan and for the motor with a centrifugal combustion air cleaner of the type which is described in U.S. Pat. No. 5,377,632, and a fuel tank with a fuel filler cap 13. A starter grip is designated 14. Under a top cover 15 there are a muffler and a filter assembly for exhaust gas purification, which has the principle design that is described in U.S. Pat. No. 5,43 8,965. Under the filter assembly under the top cover 15 there is, on the right hand side of the machine, in front of the engine 4, a muffler with a flue 16, which opens on the right hand side of the machine. The engine block 5 in the forward direction is terminated by a front end wall 18, which is perpendicular to a right hand sidewall 19 of the engine block 5. The said front end wall 18 extends from a lower right hand corner of said side wall stepwise obliquely upwards and rearwards, forming three angled sections, the angles being designated 20, 21, the latter one being hidden by the driving belt 11.

Figure 4:
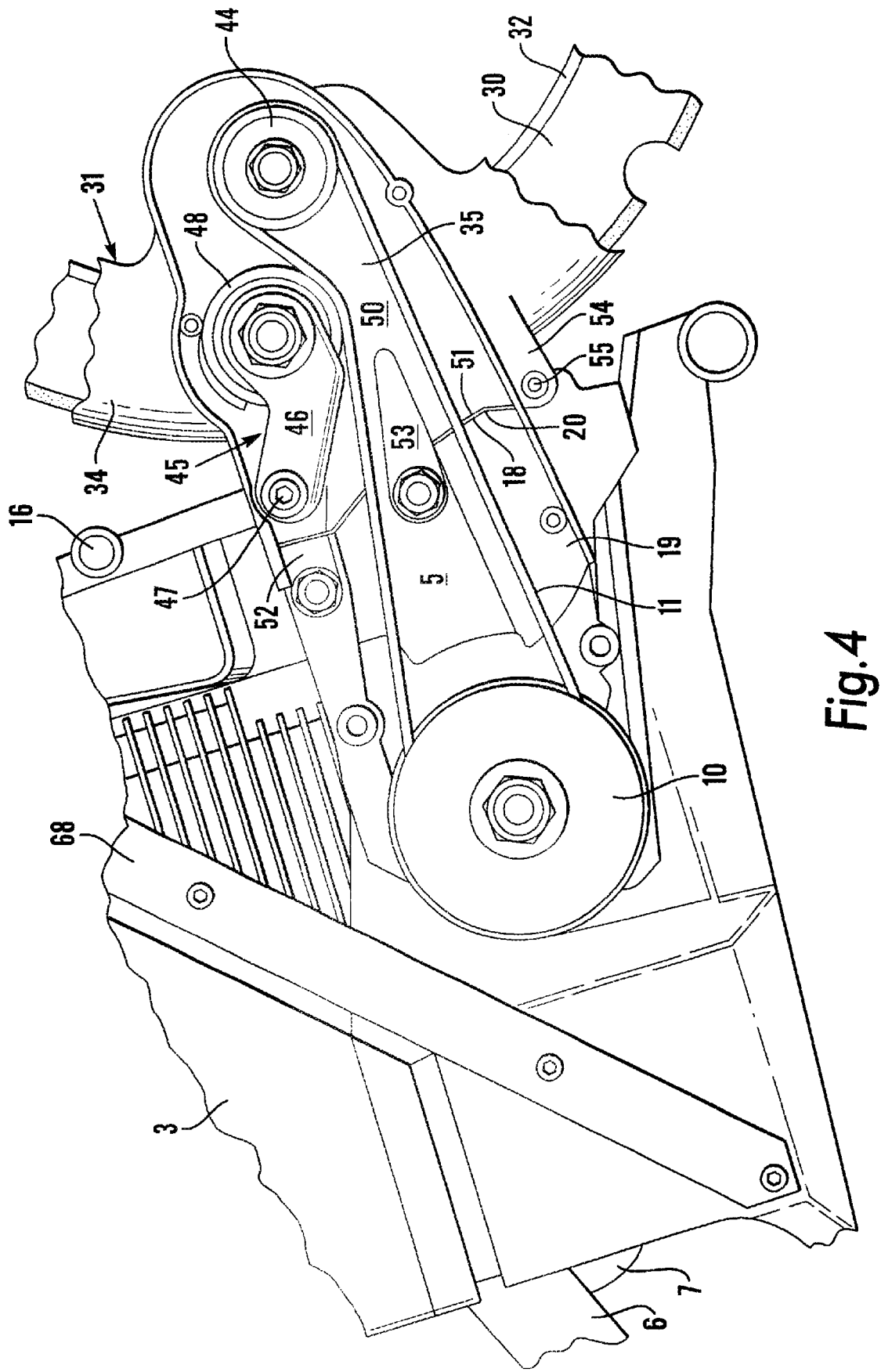
FIG. 4 shows a driving belt transmission between a motor unit and the blade and also how the rear and front parts of the ring cutter are united with one another on the right hand side of the ring cutter under a side cover which is removed in the drawing; and FIG. 5

The drive wheel 10, the driving belt 11, and the other parts of the driving belt transmission, said right hand side wall 19 of the engine block 5 in front of the drive wheel 10, and parts of the front part 10 of the machine are covered by a right hand side, elongated side cover 25, which is removed in FIG. 4.

In the front part an annular cutting- or saw blade is designated 30. The blade 30 has a design which is known and described in U.S. Pat. No. 4,646,607 and is provided with a wedge-shaped inner edge 32 intended to co-operate with a pulley 33, FIG. 6, in the blade holder 31. The pulley 33, which is provided with a V-groove, is preferably designed as is shown in SE-C-509,547. A double-walled central disc 29 having openings for cooling water in the periphery of the disc is designed according to U.S. Pat. No. 5,038,474. A conduit for the supply of cooling water is also provided but has not been shown.

The blade holder 31 consists of a blade holder chassis 35, which includes a right hand side cover 34, here referred to as guide roller cover, to the right of a centre plane 37, which is defined by the plane of the annular blade 30, and a matching cover 36, here referred to as support roller cover, to the left of said centre plane 37. In the guide roller cover 34 two guide rollers are journalled in a manner known per se, and in the support roller cover 36 a pair of opposite support rollers 42 are provided in order together with the guide rollers 38 and the pulley 33 to guide and to hold the annular blade 30. Further a clamping device 43 is provided on the guide roller cover 34 for clamping the blade in the radial direction in a known manner, a machine support 39 and a blade guard 40, which via a hinge is fastened to a nose-shaped projection on the support roller cover 34.

Under the right hand side cover 25, which extends between the rear and front main parts of the machine, and which normally is fastened by screws to the engine block 5 and to the blade holder chassis 35 by means of screws 41, there is, in the region of the blade holder chassis 35, at the very front thereof, a belt pulley 44 which has a smaller diameter than the drive wheel 10. The belt pulley 44 is provided to rotate the drive pulley 33 via a shaft. The blade holder 31 with the blade holder chassis 35 is stationary relative to the motor block and the crank-house. The belt pulley 44 is rotatably journalled in the blade holder chassis 35 but is in other respects stationary relative to said chassis. These conditions imply that the distance between the drive wheel 10 and the belt pulley 44 is fixed, wherefore the driving belt 11 cannot be tensioned or slackened for example by displacement of the belt pulley 44. Instead a belt tensioner, generally designated 45, is provided on and in the blade holder chassis 35. The belt tensioner comprises an arm 46, which is turnable about a rear axis of rotation 47 by means of a spring, which is not shown. In the opposite end of the arm 47 there is provided a belt tensioner pulley 48, which is pressed against the driving belt 11 with a certain tightening force. In the belt tensioner 45 there are also included a cam disc and other means to prevent the belt tensioner from oscillating and also in order always to keep the driving belt tensioned, even at start in order to prevent skidding and overheating caused by skidding.

Recesses are provided in the outer wall 50 shown in FIG. 4 for the bearing of the belt pulley 44 and for details for the belt tensioner 45, the plane of the main portion of said outer wall 50 coinciding with the plane of the right hand sidewall 19 of the engine block. The rear the outer wall 50 of the blade holder chassis is terminated by a rear end wall, which is perpendicular to the outer wall 50 and matches the front end wall 18 of the engine block. While the latter one is designed stepwise convex, the rear end wall 51 of the blade holder chassis is matching concave, i.e. congruently designed, so that the blade holder chassis 35 can be brought to direct and fixed contact with the engine block on the right hand side of the machine because of matching fit between the two end walls 18, 51 facing one another.

For the fixation of the blade holder chassis 35 to the engine block 5 in said matching position of the end walls 18, 51 the blade holder chassis on its right hand side is provided with three fastening tongues 52, 53 and 54, which extend rearwards out over the engine block 5 and are connected with the engine block through screws/nuts 49 (the fastening tongues 52, 53 inside of the side cover 25) and a screw 55, respectively (the fastening tongue 54 outside of the side cover 25). Through said joint the rear part 1 and the blade holder chassis SO form an integrated unit. Also the elongated side cover 25, which is fastened by means of the screws 41, contributes to strengthen the joint, particularly to increase the resistance against lateral forces.

Figure 3:
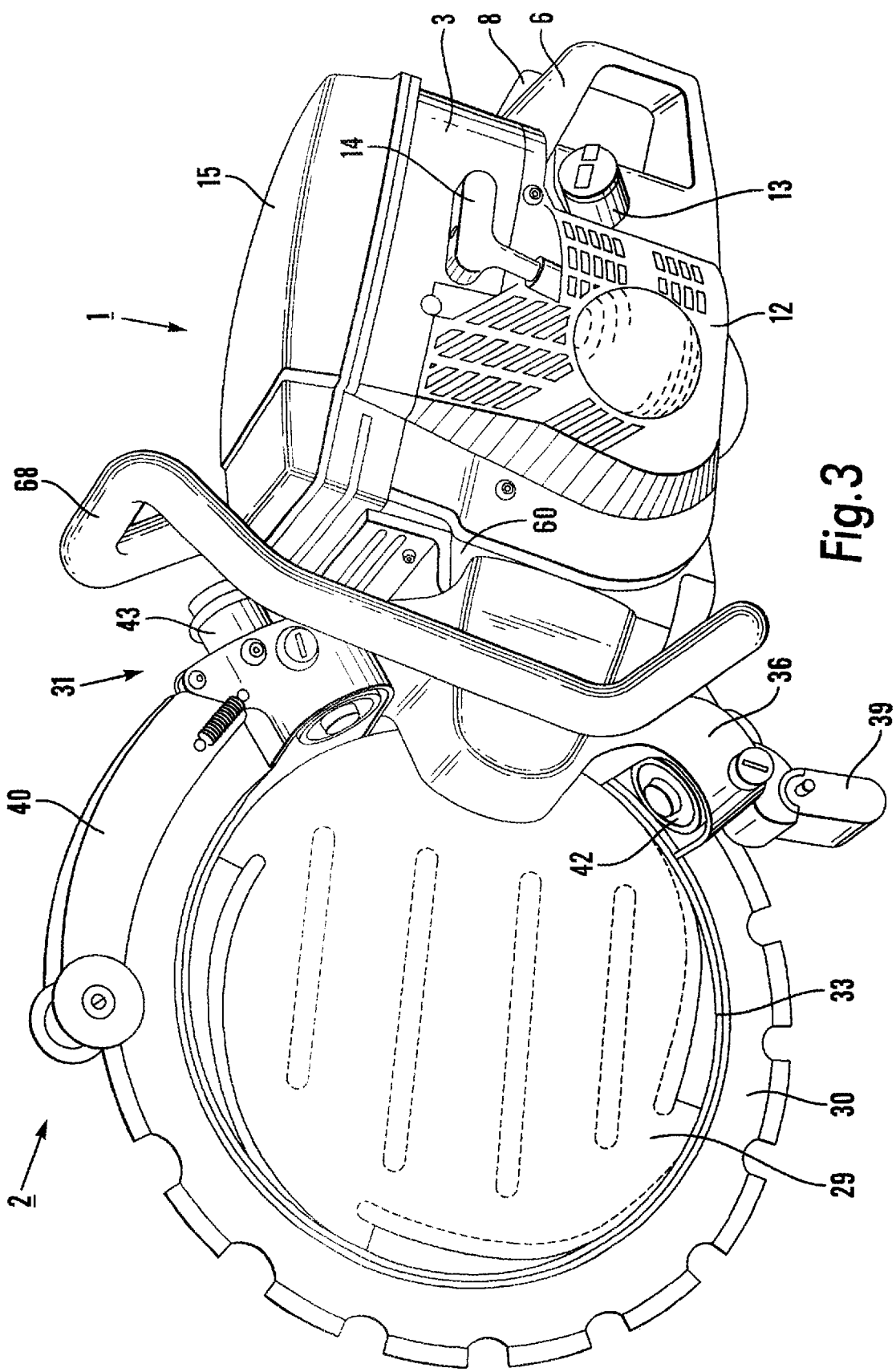
FIG. 3 shows the ring cutter in a perspectives side view from the left.
Figure 5:
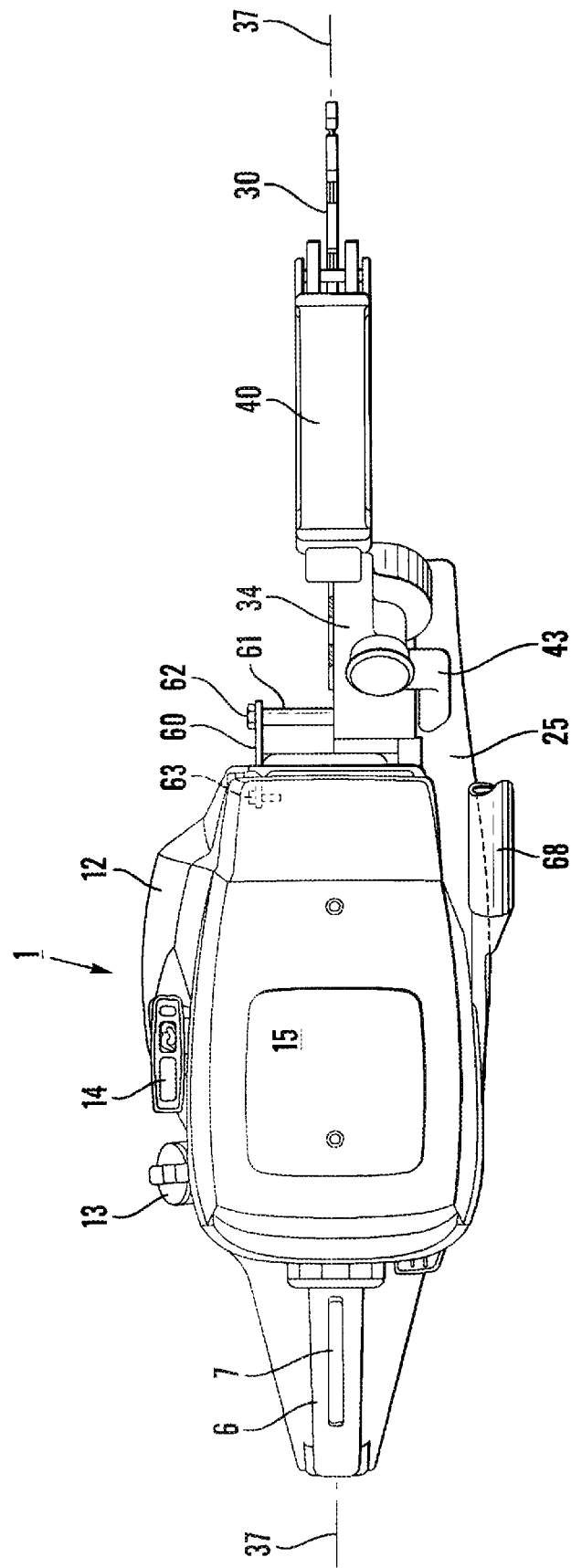
Figure 6:
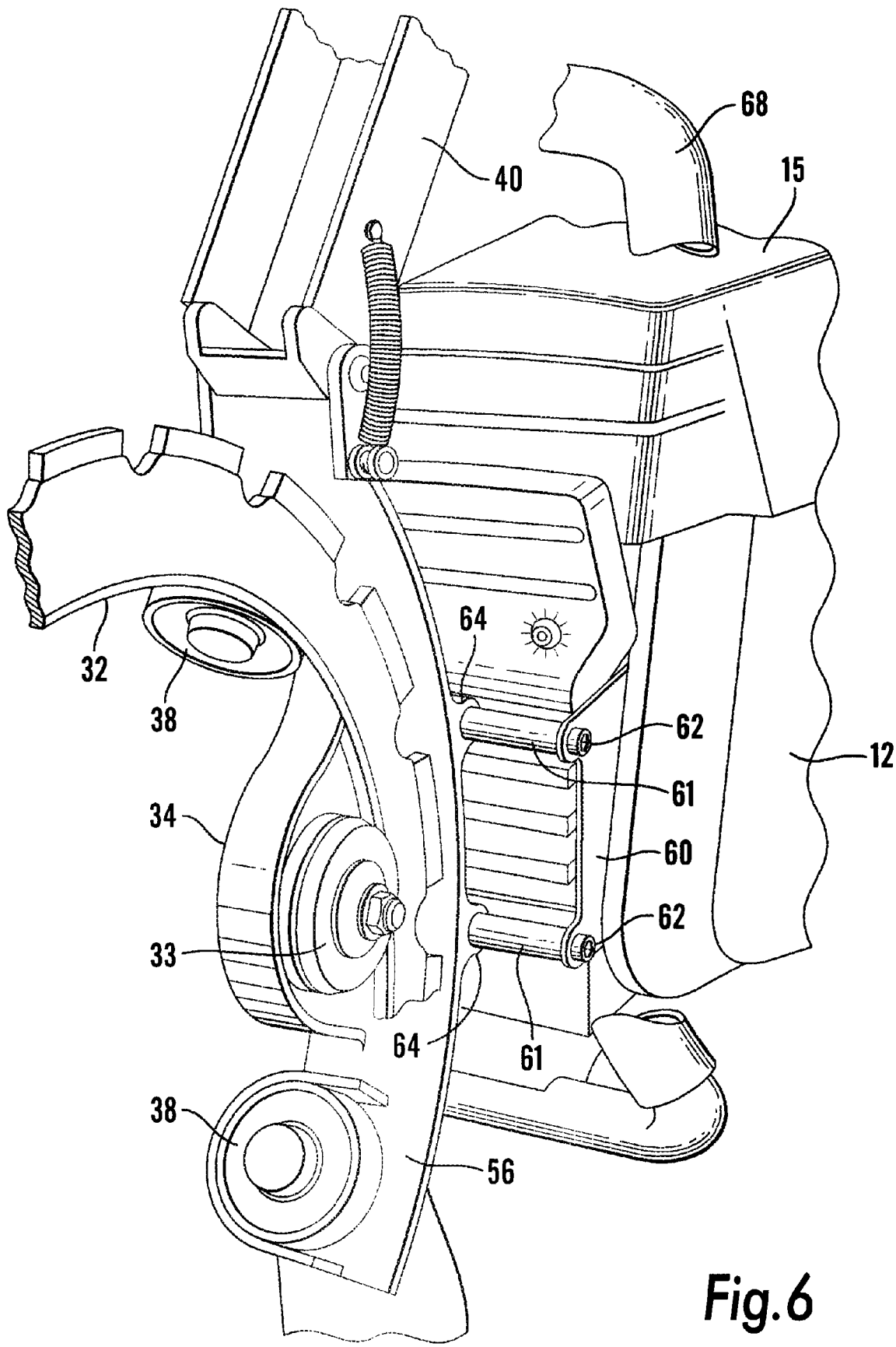
FIG. 6 is a top view and a perspective view as seen from the front and from the left, respectively, illustrating how the rear and front parts of the ring cutter are united with one another, some details having been removed in order to visualise the uniting elements on the left hand side of the machine.

When the blade 30 is mounted, the said port roller cover 36 on the left hand side of the blade holder 31 is fastened by screws to the guide roller cover 34, which forms an integrated part of the blade holder chassis 35, FIG. 3, so that the rear wall 57 of the support roller cover which is shaped as a sector of circle, which follows the contour of the blade 30, is pressed against a corresponding wall 56 of the guide roller cover at a distance behind the outer contour of the blade. Under the thus mounted support roller cover 36 there are, according to the invention, devices provided for the connection of the blade holder chassis 35 also with the left hand side of the engine block 5. These devices are shown in FIG. 5 and FIG. 6 and comprise, according to the embodiment, a plate 60, a pair of spacing sleeves 61 and pair of screws 62, which extend through the spacing sleeves. The plate 60 is secured to the left hand side of the engine block 5, under the left hand side cover 12, by means of screws 63 and projects forwards beyond the front edge of cover 12 with a portion which is visible in FIG. 5 and FIG. 6. The screws 62 extend through holes in the plate 60 and through the spacing sleeves 61 and are fastened by screwing in fastening lugs 64 on the guide roller cover 34, said fastening lugs 64 projecting rearwards behind the rear walls 56, 57, respectively, of the guide roller cover and support roller cover, which rear walls have the shape of sector of a circle and abut one another. Said walls are also provided with not shown recesses for the spacing sleeves 61. The screws 63, the plate 60, the screws 62, and the spacing sleeves 61 in combination form a firm connection between on one hand the guide roll cover 34 and hence the blade holder chassis 35 and on the other hand the left hand side of the engine block 5.

When mounted in the blade holder 31 between the guide roller cover 35 and the support roller cover 36 the blade 30 defines a centre plane 37. The rear operating handle 61 with the engine controls 7, 8 coincides with said centre plane 37. The centre plane 37 extends essentially centrally through the motor housing 1, the various components of which being distributed in a balanced condition on both sides of the centre plane 37. A handle bow 68 extends on the right hand side of the machine obliquely forwards and upwards and thereafter to the left over the machine, downwards outside of the support roller cover 36, and downwards/rearwards and in under the machine. The point of balance of the machine lies approximately under that part of the handle bow 68, which extends inwards over the machine and which normally forms a front handle for the operation of the ring cutter.

The above described ring cutter is subjected to great stresses during operation. Axial pressures, which act on the blade 30 are transferred to the engine block 5 substantially via the blade holder chassis, because the rear end wall 51 of the blade holder chassis is pressed against the front wall 18 of the engine block. Pulling forces in the axial direction are essentially taken up by the fastening tongues 52, 53 and 54 and the screw and/or nut joints belonging to the fastening tongues. Forces acting in the upwards and downwards directions on the blade 30, and the resulting, generated movement forces are taken up by, in co-operation, the fastening tongues 52–54 and the screw and/or nut joints belonging to said tongues, the matching end walls 18, 51 of the engine block and the blade holder chassis, respectively, and by the connection 61, 62, 60, 63 between the guide roller cover 34/blade holder chassis 35 and the left hand side wall of the engine chassis. Laterally directed forces acting to the left on the blade 30 develop tensile stresses on the right hand side of the machine, which are transferred to the engine block via the fastening tongues 52, 53 and 54 and the screw and/or nut joints belonging to the said tongues. Finally, forces in the lateral direction acting to the right on the blade 30 result in torque forces which are taken up by the firm connection of the blade holder chassis 35 with the left hand side of the engine block 5, which connection according to the embodiment is represented by the spacing sleeves 61, the screws 62, the plate 60, and the screws 63.

The engine block 5, the blade holder chassis 35 with the guiding roller cover 34, and the support roller cover 36 are made of metal and also at least the right hand side cover 35 is made of metal or possibly of reinforced plastic, wherein also the side cover contributes to making the machine resistant to movement forces in all directions because of the extension of the side cover between the rear and front parts of the machine and also because it through its cap shape in itself has a substantial movement of inertia and also because it is secured by means of a plurality of screws 51 to the engine block 5 and to the blade holder chassis 35.

What is claimed is:

1. Portable, combustion engine powered cutting or sawing machine, comprising a rear part (1) with a motor housing (3) with a combustion engine (4), and an engine block (5) with a crank case, and a front part (2) with an annular blade (3) and a blade holder (31), characterised in that the blade is provided in or adjacent to a center plane (37) of the machine; that the engine block (5) forms a central body in the machine including portions of said central body on both sides of said centre plane; that the blade holder (31) comprise a blade holder chassis (35), which is provided substantially on a first side of said centre plane; that the blade holder chassis is fixedly connected on one hand with a portion of the engine block which is located on said first side of the centre plane at a substantial distance from the centre plane through first joint members (52, 53, 54) and on the other hand with a portion of the engine block which is located on a second, opposite side of the centre plane, at substantial distance from the centre plane through second joint members (60, 61, 62, 63), that a first cover (34) is provided on the first side of the machine and a second cover (36) is provided on the second side of the machine, that said first cover forms an integrated part of the blade holder chassis, that said second cover at least partly covers said second joint members, and that said first and second cover form the blade holder.

2. Machine according to claim 1, characterised in that a rear end wall (51) of the blade holder chassis abuts a front end wall (18) of the engine block; that the contact between said end walls is fixed through said first joint member which connect the blade holder chassis with the engine block on the outside of at least any of said engine block and said chassis; and that said second joint members between the blade holder chassis and said second, opposite side of the engine block at least partly are covered by a cover (36) on said second, opposite side of the machine, which cover together with a cover (34) on the first side of the machine, which forms an integrated, part of the blade chassis, form the blade holder.

3. Machine according to claim 1, characterised in that a power transmission comprises at least a drive pulley (33) in the blade holder for the drive of the blade and a driving belt (11); that the driving belt extends along the said first side of the machine in a plane at a distance from a centre plane (37); and that the driving belt, a drive wheel connected to the engine, and a belt pulley (44) connected to the drive pulley of the blade are covered by an elongated side cover (25) which extends from the rear part a piece in over the front part.

4. Machine according to claim 1, characterised in that the front belt pulley is journalled in a blade holder chassis (35), which forms a first main part of the blade holder, said blade holder being located on the same side of said centre plane as said elongated side cover, which covers the driving belt transmission; that the blade holder chassis is fixedly connected to the engine block; that the distance between the centres of the drive wheel (10) and the belt pulley (44) is fixed; and that a driving belt tensioner (45) is provided, at least the main part thereof, under said elongated side cover (25).

5. Machine according to claim 1, characterised in that a rear operating handle (6) with engine control (7, 8) is provided in said centre (plane 37).

6. Machine according to claim 3, characterized in that said elongated side cover, (25) which extends from the rear part and over the front part, is fastened by means of screws (41) to the engine block (5) and to the blade holder chassis (35).

\* \* \* \* \*